(12) United States Patent
Park et al.

(10) Patent No.: US 6,289,366 B1
(45) Date of Patent: *Sep. 11, 2001

(54) SPEEDY SHIFT APPARATUS FOR USE IN ARITHMETIC UNIT

(75) Inventors: Sun Ju Park; Hyeok Kang, both of Kyoungki-do (KR)

(73) Assignee: Hyundai Electronics Industries Co., Ltd., Ichon-shi (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,187

(22) Filed: May 22, 1998

(30) Foreign Application Priority Data

May 22, 1997 (KR) .................................. 97-20107

(51) Int. Cl.[7] ................................................ G06F 7/00
(52) U.S. Cl. .................................... 708/209; 708/205
(58) Field of Search ............................ 708/205, 209, 708/550, 551, 495, 496, 497, 501, 505, 508, 510

(56) References Cited

U.S. PATENT DOCUMENTS

| 5,424,967 | * | 6/1995 | Lee ........................................ 708/551 |
| 5,450,607 | | 9/1995 | Kowalczyk et al. . |
| 5,559,730 | * | 9/1996 | Marui et al. ........................... 708/209 |
| 5,726,926 | * | 3/1998 | Makino ................................. 708/505 |
| 5,987,603 | * | 11/1999 | Shah ..................................... 712/300 |

FOREIGN PATENT DOCUMENTS

| 3-113635 | 5/1991 | (JP) . |
| 4-160533 | 6/1992 | (JP) . |

* cited by examiner

*Primary Examiner*—Chuong Dinh Ngo
(74) *Attorney, Agent, or Firm*—Jacobson Holman, PLLC

(57) ABSTRACT

An shift circuit is used in an arithmetic unit, for shifting m-bit input data to left or in right, m being a positive integer. The shift circuit includes a latch for temporarily storing the m-bit input data and additional 2n-bit, wherein n is a positive integer; a shift logic block, receiving (m+2n)-bit data from the latch means, for providing (2n+1) number of m-bit shifted data; a sensor for generating a selection signal based on a predetermined shift condition; and a multiplexer, in response to the selection signal, for selecting one of the (2n+1) number of m-bit shifted data as an output signal of the apparatus.

8 Claims, 5 Drawing Sheets

FIG. 4

TABLE 1

| nrm_no | MSB2bit<1:0> | muxsel<1:0> | SELECTION |
|---|---|---|---|
| 0 | 00 | 10 | L-SHIFT |
| 0 | 01 | 00 | NO |
| 0 | 10 | 01 | R-SHIFT |
| 0 | 11 | 01 | R-SHIFT |
| 1 | 00 | 11 | NO |
| 1 | 01 | 11 | NO |
| 1 | 10 | 11 | NO |
| 1 | 11 | 11 | NO |

TABLE 2

| A \ BC | MSB2bit<1:0> | | | |
|---|---|---|---|---|
| nrm_no | 00 | 01 | 11 | 10 |
| 0 | L | · | R | R |
| 1 | · | · | · | · | ns
SPEEDY SHIFT APPARATUS FOR USE IN ARITHMETIC UNIT

FIELD OF THE INVENTION

The present invention relates to an arithmetic unit of a processor; and, more particularly, to a shift apparatus, for use in an arithmetic unit, which is capable of providing a speedy shift operation in an effective manner.

DESCRIPTION OF THE PRIOR ART

An arithmetic unit such as a floating point unit is generally employed various applications such as a processor, which contains circuits that perform arithmetic operations. The circuits are necessarily provided with a shifting apparatus for displacing or shifting an ordered set of digits one or more places to left or right, wherein the shift may be equivalent to multiplying by a power of the base.

The shifting apparatuses generally perform a shift operation based on a control signal representing a desired shift condition. However, since, in this case, the shift operations are sequentially executed in response to the control signal, it may allow the shifting apparatus to suffer uncontrollable shifting delays caused by inherent circuit delay factors. Furthermore, the additional delay time is required for the shifting apparatus to response to the control signal representing the desired shift condition. Therefore, it is difficult to implement a speedy shift apparatus to be applicable to a high speed process system.

SUMMARY OF THE INVENTION

It is, therefore, an object of the invention to provide an apparatus, for use in an arithmetic unit, which is capable of effectively providing speedy shift operations of ordered digital data in a more efficient use of the hardware logic circuit.

In accordance with one aspect of the present invention, there is provided An apparatus, for use in an arithmetic unit, for shifting m-bit input data to left or in right, m being a positive integer, which comprises: latch means for temporarily storing the m-bit input data and additional 2n-bit, wherein n is a positive integer; shift means, receiving (m+2n)-bit data from the latch means, for providing (2n+1) number of m-bit shifted data; selection signal generation means for generating a selection signal based on a predetermined shift condition; and selection means, in response to the selection signal, for selecting one of the (2n+1) number of m-bit shifted data as an output signal of the apparatus.

BRIEF DESCRIPTION OF THE DRAWINGS

The above and other objects and features of the present invention will become apparent from the following description of preferred embodiments given in conjunction with the accompanying drawings, in which:

FIG. 4 illustrates explanatory diagrams of state and Boolean diagrams for the sensor shown in FIG. 2;

DETAILED DESCRIPTION OF THE PREFERRED EMBODIMENTS

Figure 1:
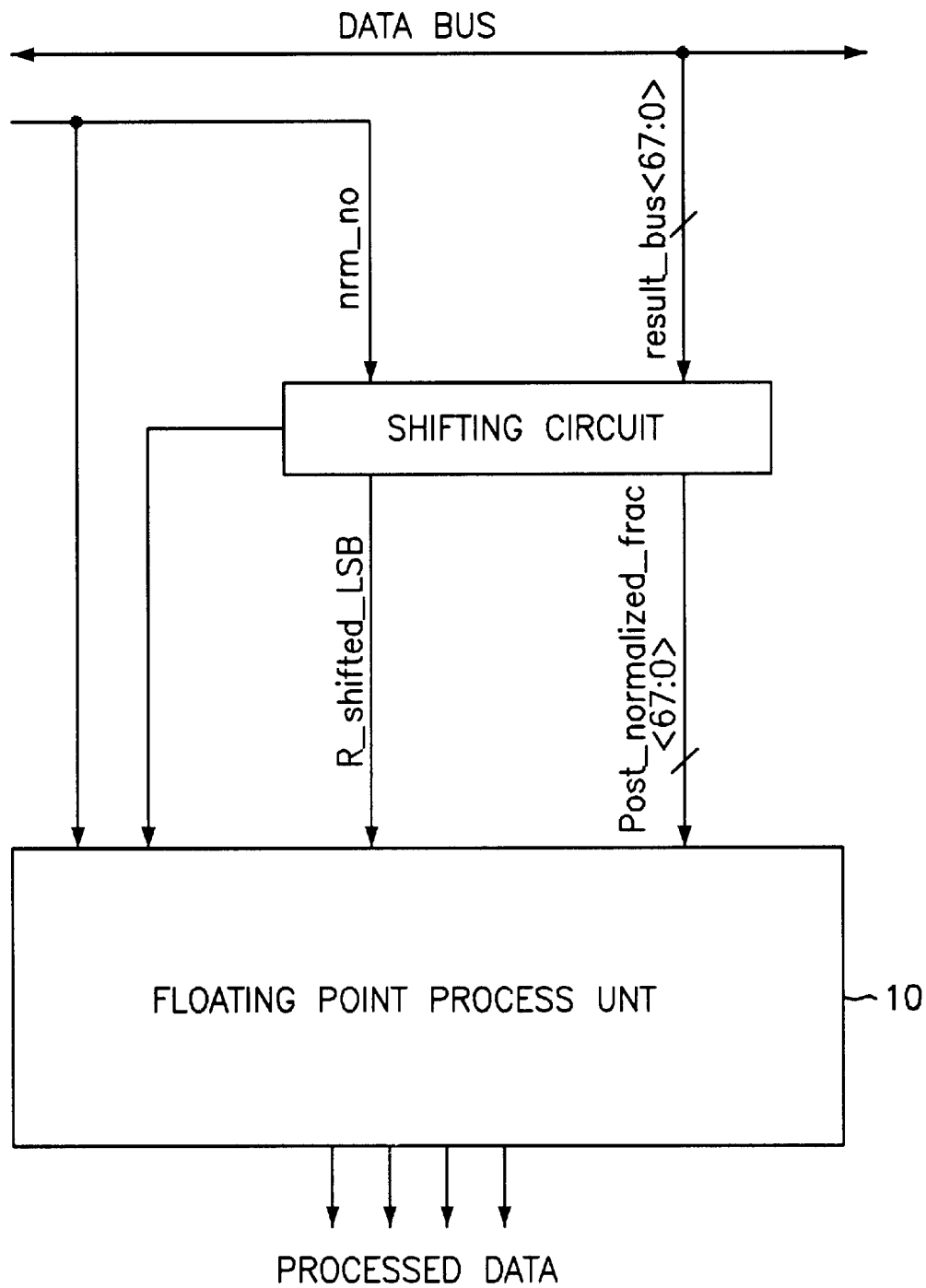
FIG. 1 shows a schematic block diagram of an arithmetic unit employing a shifting circuit in accordance with the present invention.

Referring to FIG. 1, there is shown an arithmetic unit employing a shifting circuit in accordance with the present invention. The arithmetic unit includes a floating point process unit 10 and a shifting apparatus 20.

The floating point process unit 10 serves to perform a rounding operation for a fractional part of input data and an arithmetic function for a power of the base thereof. The rounding operation is to take a quantity to the nearest digit by using some rule which minimizes an error resulting from deleting the less significant digits of the input data. For instance, in binary multiplication, assuming that a multiplicand is of 4-bit and multiplier is of 4-bit, the final product is expressed by maximum 8-bit. In this case, if the output of the arithmetic unit is of 4-bit, the 8-bit final product should be processed by using the rounding operation in order to obtain the 4-bit output data. In a similar manner, in 32-bit architecture, the 64-bit final product should be further processed to obtain a desired 32-bit output therefrom through the use of the rounding operation.

However, when the operands are the fractional parts of the input data, the rounding operation does not always secure a precise calculation result. For example, assuming that a multiplicand is $0.0001 \times 10^3$ and multiplier is $0.0010 \times 10^7$, the fractional portions and powers of the radix are independently calculated and, through the rounding operation, there can be a serious error that 4-bit output data for the fractional portions is expressed by 0.0000.

Therefore, the fractional potions of the input data are conventionally adjusted by using the shifting apparatus. That is, $0.0010 \times 10^7$ is converted into $0.1 \times 10^5$ through the use of the shifting operation. This is also expressed as a normalization process. The normalized fractional portions are then calculated in the floating point processor 10 to thereby eliminate the above potential error in an effective manner. In accordance with a preferred embodiment of the present invention, the shifting circuit 10 is capable of effectively providing speedy shift operations of ordered digital data in a more efficient use of the hardware logic circuit.

Figure 2:
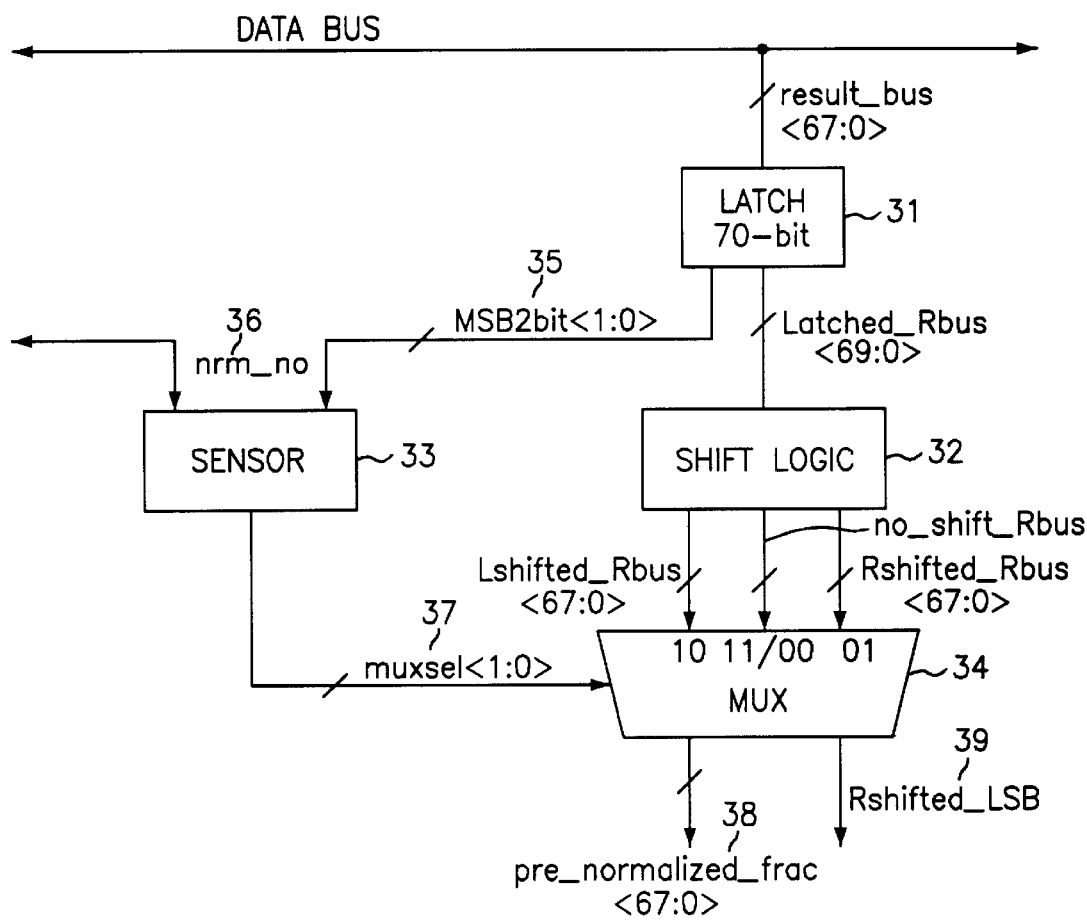
FIG. 2 discloses a detailed block diagram of the shifting circuit in accordance with a preferred embodiment of the present invention.

Referring to FIG. 2, there is a detailed block diagram of the shifting circuit 20 according to the preferred embodiment of the present invention. The shifting circuit includes a latch circuit 31, a shift logic block 32, a sensor 33 and a multiplexer 34.

The latch circuit 31 includes, e.g., 70-bit storage locations for temporarily storing 68-bit data result_bus<67:0>to be shifted and generates two outputs, e.g., MSB2bit<1:0>signal and Latched_Rbus<69:0> signal.

The shift logic block 32 has three outputs, e.g., Lshifted_Rbus<67:0> signal, no_shift_Rbus<67:0> signal and Rshifted_Rbus<67:0> signal, wherein the Lshifted_Rbus<67:0> signal includes a left-shifted data; the no_shift_Rbus<67:0> signal contains not-shifted input data; and the Rshifted_Rbus<67:0> signal has a right-shifted data.

The sensor 33 is implemented by using hardware, e.g., a plurality of logic gates and receives micro-code signal nrm_no and the MSB2bit<1:0> signal. Based on the received micro-code signal nrm_no and the MSB2bit<1:0> signal, the sensor 33 generates a selection signal which is coupled to the multiplexer 34.

The multiplexer 34 receives the selection signal and, based on the selected signal, provide one of three outputs of the shift logic block 32 as the output from the shifting circuit 20 shown in FIG. 1.

Figure 3:
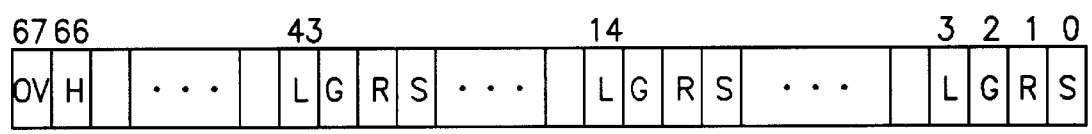
FIG. 3 describes an exemplary diagram of a data format loaded in the latch circuit shown in FIG. 2.

Referring to FIG. 3, there is shown an exemplary diagram illustrating an input data format for the shifting circuit 20. As shown, the input data result_bus<67:0> can be consisted of, e.g., 68 bits. When the data type is a single precision real, valid bits become [66:43] and other bits are represented by "0". When the data type is a double precision real, the valid bits become [66:14] and other bits are represented by "0". When the data type is an extended recision real, the valid bits become [66:3]. Each of the data types further includes three bits which are represented by GRS(Guard, Rounding, Sticky) and are used in the rounding process in the floating point process 10. A most significant bit(MSB)[67] represents a carry caused by a previous operation. The bit [66] can be of 1 in case of the single or the double precision real data type.

Referring to FIG. 4, there are shown a state table and a Boolean diagram of the sensor 33. As described above, the sensor 33 generates the selection signal, i.e., muxsel<1:0>, through the use of a combination of most significant 2-bit of the input data MSB2bit<1:0> and micro-code nrm_no(36). The muxsel<1:0> is then coupled to the multiplexer 34.

As shown in the table, when the micro-code nrm_no(36) is in an active state, e.g., 1, the muxsel<1:0> signal becomes "11" and the no_shift_Rbus<67:0> signal is selected as the output of the multiplexer 34.

When the micro-code nrm_no(36) is in an inactive state, e.g., 0, and the first bit of the MSB2bit<1:0> signal is of "1", the muxsel<1:0> signal becomes "01" and the Rshifted_Rbus is selected as the output of the multiplexer 34.

When the micro-code nrm_no(36) is in an inactive state, e.g., 0, and the MSB2bit<1:0>o is of "00", the muxsel<1:0> becomes "10" and the Lshifted_Rbus<67:0> is output of the multiplexer 34.

Figure 5:
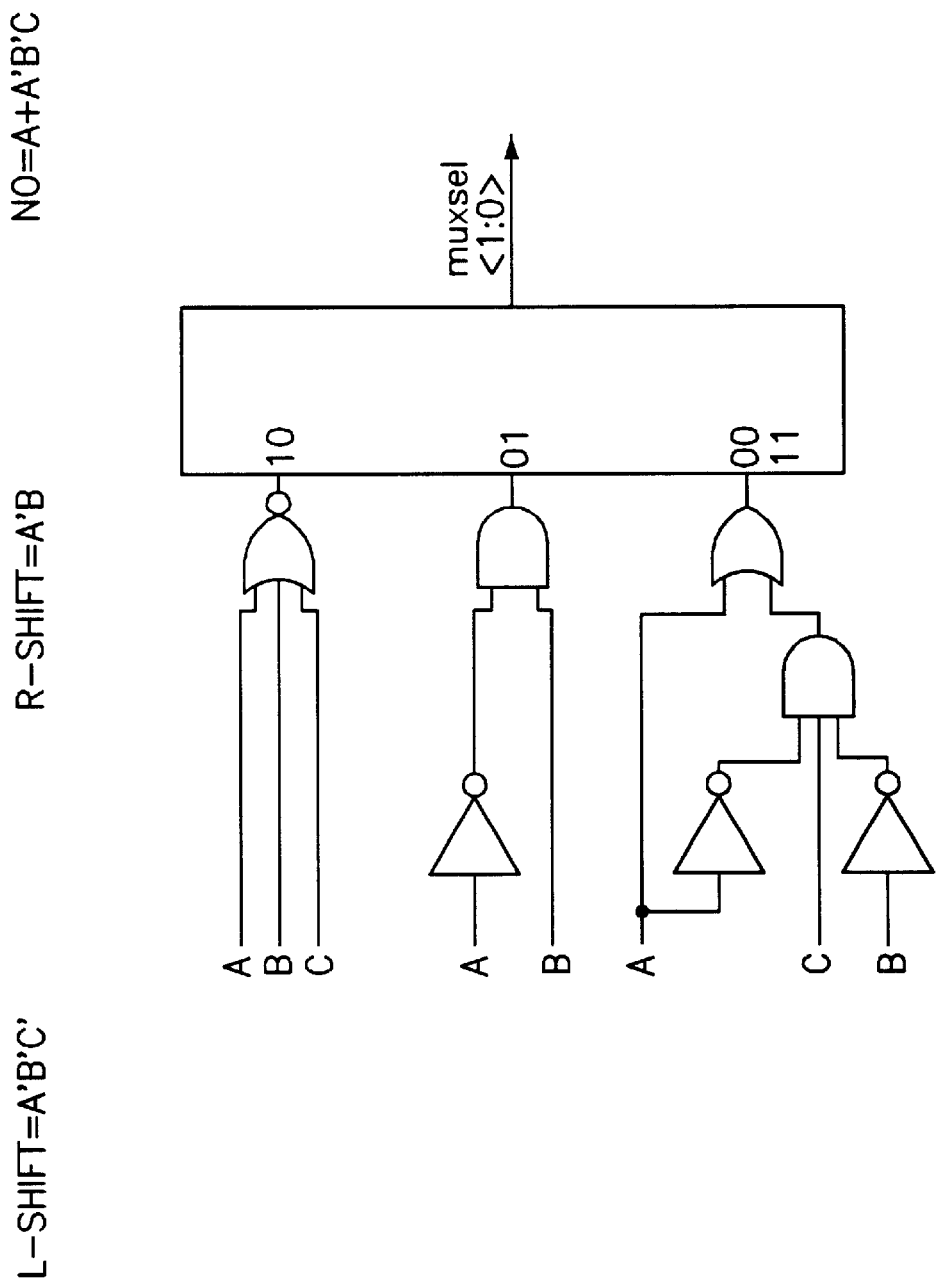
FIG. 5 demonstrates a detailed diagram of the sensor in accordance with the preferred embodiment of the present invention.

Based on the above situation, the table 2 can be constructed and a logic circuit shown in FIG. 5 is then implemented by using a plurality of logic gates and Boolean algebra extracted by using the table 2.

Referring back to FIGS. 2 and 3, although, for the sake of convenience, the input data result_bus<67:0> is represented by 68-bit data, any other number of bits can be preferably employed as input data in the present invention. The output Latched_Rbus<69,0> from the latch circuit 31 should be obtained by adding 2n-bit to the input data, wherein n is a positive integer and 2n-bit can be divided two portions, each added to each end side of the input data. While, another output MSB2bit<1:0> is extracted from the original input data result_bus<67:0>.

Figure 6:
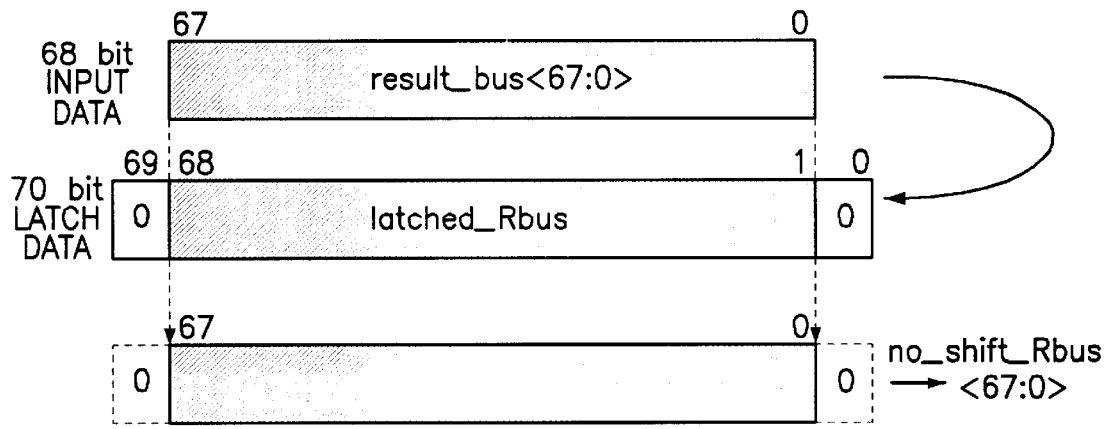
FIGS. 6, 7 and 8 provide exemplary diagrams of the shifting operations performed by the shifting circuit shown in FIG. 1.
Figure 7:
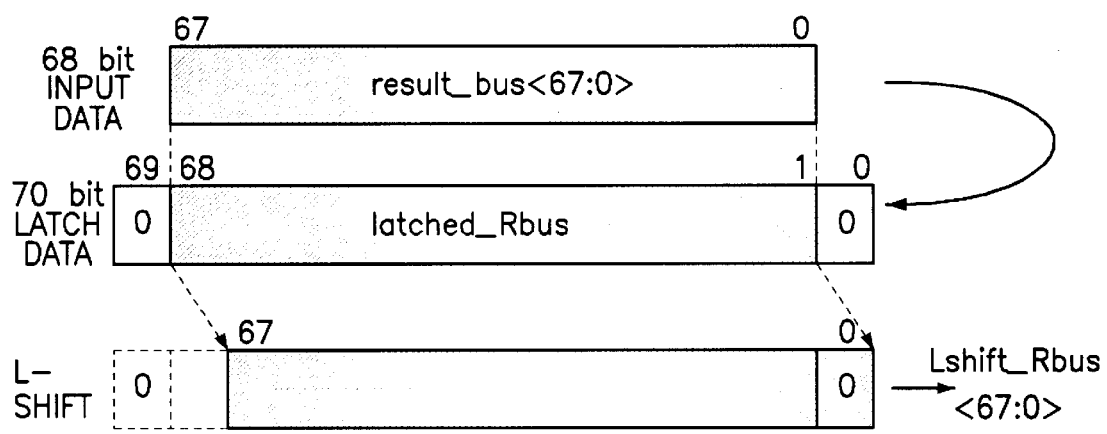
Figure 8:
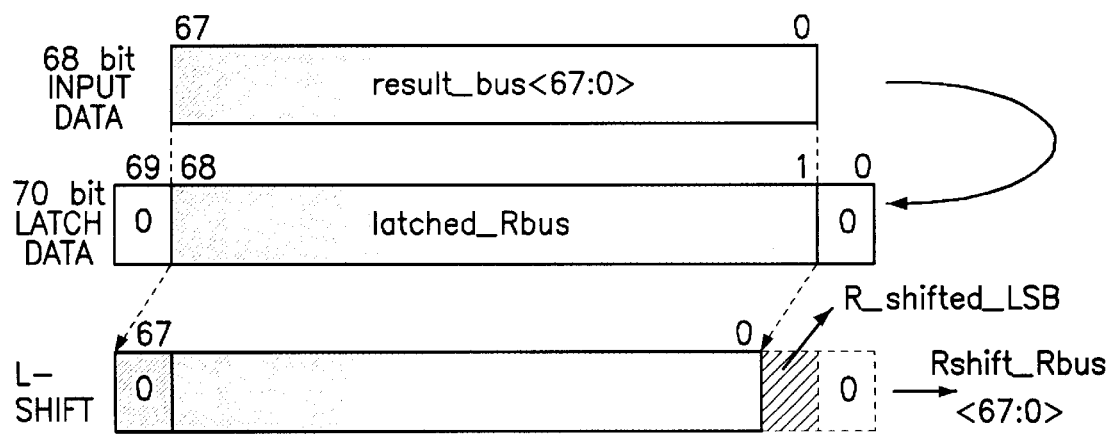

Referring now to FIGS. 6 to 8, there are illustrated explanatory diagrams showing the shifting operation of the shift logic block 32 shown in FIG. 2. As shown, the 68-bit input data result_bus<67:0> is converted into 70-bit latch data Latched_Rbus<69:0> by adding each bit to each end side thereof. The Latched_Rbus<96:0> is then relayed to the shift logic block 32. The shift logic block 32 generates three output signals: no_shift_Rbus<67:0>, Lshifted_Rbus<67:0> and Rshifted_Rbus<67:0>. That is, the original input data of the Larched_Rbus<69:0> is outputted as the no_shift_Rbus<67:0>. 68-bit data counted from least significant bit of Larched_Rbus<69:0> is outputted as the Lshifted_Rbus<67:0>. 68-bit data counted from most significant bit of Larched_Rbus<69:0> is outputted as the Rshifted_Rbus<67:0>.

These output signals are then fed to the multiplexer MUX 34 which is responsive to the selection signal muxsel<1:0> from the sensor 33 and select one of the no_shift_Rbus<67:0>, the Lshifted_Rbus<67:0> and the Rshifted_Rbus<67:0> as the output pre_normalized_frac<67:0> therefrom. When the Rshifted_Rbus<67:0> is selected as the pre_normalized_frac<67:0>, the multiplexer 34 also provides Rshifted_LSB received from the shift logic block 32 (not shown) to the floating point process unit 10 shown in FIG. 1. The Rshifted_LSB is used in the rounding process thereof.

As may be seen from the above, the shift circuit of the present invention simultaneously performs the detection process of the required shift condition and possible shift operations of input data by using independent sensor and shift logic block. As a result, based on the detected shift condition, the shift circuit can simply select desired one of the shifted data obtained by the possible shift operation to thereby effectively provide a speedy shift operation thereof. Furthermore, in accordance with the present invention, the sensor is implemented by using a plurality of logic gates, wherein the logic gates are selected based on the input signal and the output signal by using Boolean algebra to thereby obtain the rapid detection process.

Although the present invention has been described with reference to a particular embodiment, n-bit shift circuit can be easily implemented by appropriately adding 2n-bit to the input data and expanding the outputs of the shift logic block, wherein n is a positive integer.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus, for use in an arithmetic unit, for shifting m-bit input data to left or right, m being a positive integer, which comprises:

latch means for temporarily storing the m-bit input data and additional 2n-bit, wherein n is a positive integer;

shift means receiving (m+2n)-bit data from the latch means, for providing (2n+1) number of m-bit shifted data;

a sensor for generating a selection signal based on a state of the most significant 2-bit of the m-bit input data and a micro-code signal;

selection means, in response to the selection signal, for selecting one of the (2n+1) number of m-bit shifted data as an output signal of the apparatus.

2. The apparatus as recited in claim 1, wherein said 2n-bit includes two n-bit portion and each of the n-bit portions is located at end side of the m-bit input data and wherein each of 2n-bit is of "0".

3. The apparatus as recited in claim 2, wherein the m-bit shifted data includes n number of left-shifted m-bit data, the m-bit input data and n number of right-shifted m-bit data.

4. The apparatus as recited in claim 3, wherein the selection signal generation means includes a plurality of logic gates, wherein the logic gates are selected based on the predetermined shift condition and the selection signal by using Boolean algebra.

5. The apparatus as recited in claim 4, wherein n is 1 and the right-shifted m-bit data is an m-bit data counted from the most significant bit(MSB)of the (m+2n)-bit data.

6. The Apparatus as recited in claim 5, wherein the left-shifted m-bit data is an m-bit data counted from the least significant bit(LSB) of the (m+2n)-bit data.

7. The apparatus as recited in claim 6, wherein the m-bit input data includes one or more rounding information at least significant bits of the m-bit input data and, when the right-shifted m-bit data is selected, the output signal further includes rounding information missed from said one.

8. The apparatus as ricited in claim 7, wherein the selection means includes a multiplexer.

* * * * *